United States Patent [19]
Bowers

[11] Patent Number: 5,409,241
[45] Date of Patent: Apr. 25, 1995

[54] POSITIVE DRIVE COMPENSATING SHAFT SEAL

[75] Inventor: David Bowers, Bath, Me.

[73] Assignee: Woodex Bearing Company, Inc., Bath, Me.

[21] Appl. No.: 91,593

[22] Filed: Jul. 14, 1993

[51] Int. Cl.[6] .............................................. F16J 15/38
[52] U.S. Cl. ........................................ 277/65; 277/41; 277/93 R
[58] Field of Search .................... 277/35, 36, 38, 39, 277/40, 41, 47, 48, 65, 81 R, 93 R

[56] References Cited

U.S. PATENT DOCUMENTS

| | | | |
|---|---|---|---|
| 2,405,464 | 8/1946 | Storer, Jr. | 277/38 |
| 2,695,799 | 11/1954 | Chambers, Jr. et al. | 277/47 |
| 3,116,066 | 12/1963 | Koppius | 277/38 |
| 3,188,096 | 6/1965 | Wilkinson | 277/65 |
| 3,368,819 | 2/1968 | Otto | 277/48 |
| 3,591,188 | 7/1971 | Eisner | 277/65 X |
| 3,746,350 | 7/1973 | Mayer et al. | 277/96.1 X |
| 3,758,179 | 9/1973 | Smith | 277/41 X |
| 3,877,706 | 4/1975 | Haas et al. | 277/41 |
| 3,941,395 | 3/1976 | Ball et al. | 277/41 |
| 4,822,056 | 4/1989 | Bowers | 277/65 X |

Primary Examiner—William A. Cuchlinski, Jr.
Assistant Examiner—John L. Beres
Attorney, Agent, or Firm—Mark T. Basseches; Paula T. Basseches

[57] ABSTRACT

A compensating positive drive rotary shaft seal assembly comprises a two-part housing, each housing part including a radially directed stator surface surrounding the shaft. A collar is keyed to the shaft between the stators, and an axially shiftable rotor is interposed between the collar and each stator. The rotors are positively coupled to the collar for rotation with the shaft. An elastomeric annular seal is mounted on the shaft between each rotor and the collar. The housing parts are axially shiftable toward and away from each other adjustably to compress the elastomeric seals and yieldably bias the rotors against the stators. An internal annular gasket spanning the housing parts encompasses the seal assembly and defines a sealed chamber coupled to one or more purge ducts.

9 Claims, 2 Drawing Sheets

POSITIVE DRIVE COMPENSATING SHAFT SEAL

BACKGROUND OF THE INVENTION

The present invention relates to rotary shaft seal such as, but not limited to, conveyor shaft seals and the like. More particularly, the present invention is directed to a compensating seal which may function as a substitute or replacement for conventional compression packing or stuffing box assemblies.

PRIOR ART

It is conventional practice in a rotary device including a driver element externally of a vessel or conveyor and a driven element within the vessel or conveyor to interpose a rotary seal arrangement at the vessel wall to prevent contamination or passage of materials within the vessel through the area traversed by the rotary shaft.

A conventional means for preventing leakage is a stuffing box, namely a chamber surrounding the shaft and filled with an annular convolution or convolutions of packing material directly engaging the shaft. A follower gland enters the chamber and bears against the packing, adjustment means being provided to regulate the pressure with which the gland bears against the packing and accordingly the pressure with which the packing bears against the shaft.

The disadvantages inhering in stuffing boxes are well known. The devices require frequently disassembly for replenishment of lubricant within the packing, impose a substantial start-up torque on the shaft, result in significant erosion and shaft wear at the interface of shaft and packing etc. Importantly, stuffing boxes are virtually useless where the shaft exhibits an eccentricity in the course of its rotation.

Recently, shaft seals have been developed which compensate for the shortcomings of conventional stuffing box constructions. By way of example, reference is made to the following U.S. letters patent owned by or exclusively licensed to the assignee of the instant application, to wit U.S. Pat. Nos. 3,988,026; 4,217,980; 4,365,707; 4,809,992; 4,822,056.

The subject patents are directed to rotary shaft seals capable of accommodating significant shaft eccentricities without compromising the sealing qualities thereof and have enjoyed substantial commercial success.

The devices employ a chamber through which the shaft passes, the chamber encompassing an elastomeric annulus mounted on the shaft. The end margins of the annulus bear against thrust washers which are driven in rotation as a result of the frictional forces exerted on the washers by the axially expanding elastomeric annulus. The washers in turn are disposed in wiping engagement with an opposed pair of stators, the rotating washers wipingly engaging the stators and defining at the annular interface between stator and washer a seal area. Since the seal area extends radially between the relatively moving parts a significant amount of eccentricity of the shaft may be accommodated.

Notwithstanding the wide-spread commercial success of seals of the noted patents, the structures thereof include drawbacks which are obviated by the seal of the instant invention. More particularly, the prior devices (as does the device of the instant invention) include a rotor to stator interface involving metal to polymer contact, it being recognized that after usage the polymer material will wear necessitating adjustment (added compression) to assure that the elastomer of the device continues to drive the wiper units in a rotary fashion to provide the necessary sealing effect. If wear is significant, the adjustment must be frequently effected. Moreover, readjustment mandates axial shifting of the elastomeric seal member along the shaft, a movement which is resisted by the seal due to the high coefficient friction of the material which must be necessarily be employed to provide a driving action of the wiper washers.

A further drawback of the structures of the noted patents resides in the delicacy with which the adjustment must be accomplished, i.e. compressed sufficiently to assure that the wipers are driven by the elastomer, but the pressure cannot be so high as to stall the wipers.

Since the devices of the patent are dependent upon axial compression between the driving elastomer and driven wipers, the device is not readily adaptable to shafts which tend to elongate in use from the idle or non-driven condition to the active or driven condition. Such elongation and foreshortening cycles are frequently encountered where the shaft is immersed in a heated or cooled environment.

SUMMARY OF THE INVENTION

The present invention may be summarized as directed to an improved shaft seal device such as is used to prevent the flow of liquid and/or pulvurent materials through the end walls of conveyors or the like. More particularly, the invention is directed to an improved seal device for a rotary shaft which functions as a substitute for a stuffing box, the device being characterized by long life, an ability to be readily adjusted responsive to wear without disassembly, an ability to accommodate significant eccentricities of the shaft without loss of seal integrity, and an ability to compensate for axial expansion and contraction of the shaft without loss of sealing function.

In accordance with the invention, the seal is comprised of a housing formed of two halves each half carrying a stator portion extending radially relative to the shaft axis. A collar is mounted between the stators and is fixedly keyed to rotate with the shaft. A pair of rotors include outwardly directed end faces wipingly engaging the inwardly directed faces of the stators. A series of drive pins extends between the rotors, the drive pins being keyed to rotate with the collar, but being axially slideable relative thereto. A pair of elastomeric bands is mounted on the shaft one to each side of the collar, the elastomeric bands having inner diameter portions in sealed engagement against the shaft to prevent passage of materials along the shaft. The bands are in compressed condition to yieldably bias the rotors against the stators defining a radially extending wiping seal area which prevents the passage of detritus around the interface between rotors and stators. The rotors are positively driven by the pins and thus rotation of the rotors is in no way dependent upon a driving force exerted by the elastomeric bands.

Optionally and preferably, an axially compressable elastomeric gasket is interposed between the housing halves in surrounding relation of the chamber defined by the moving seal components. A purge duct is communicated to the sealed chamber enabling any accumulated detritus to be purged and permitting, if desired, a pressure head to be maintained within the chamber.

Preferably, either the rotors or stators are formed of a low coefficient of friction polymer, the other of the rotors or stators being formed of metal whereby, wear is confined to the sacrificial polymeric material. As clearances develop through wear, it is merely necessary to shift the housing halves toward each other thus to achieve the desired wiping pressure between rotors and stators. Importantly, and unlike the seals of the prior art, since the elastomeric members surrounding the shaft do not perform a driving function of the rotors, it is possible to form the elastomeric seals or to line the shaft engaging components thereof with a low coefficient of friction material enabling the seals to slide relative to the shaft during adjustment without compromising the integrity of the connection between seals and shaft.

With the foregoing in mind, it is an object of the invention to provide an improved positive drive seal for a rotary shaft.

Still a further object of the invention is the provision of a device of the type described which is highly efficient in preventing the escape of contaminants to the environment.

Still a further object of the invention is the provision of a seal of the type described which may be employed for protracted periods without requiring replacement, and which may be readily adjusted for wear without disassembly.

DETAILED DESCRIPTION OF THE VIEWS

Figure 1:
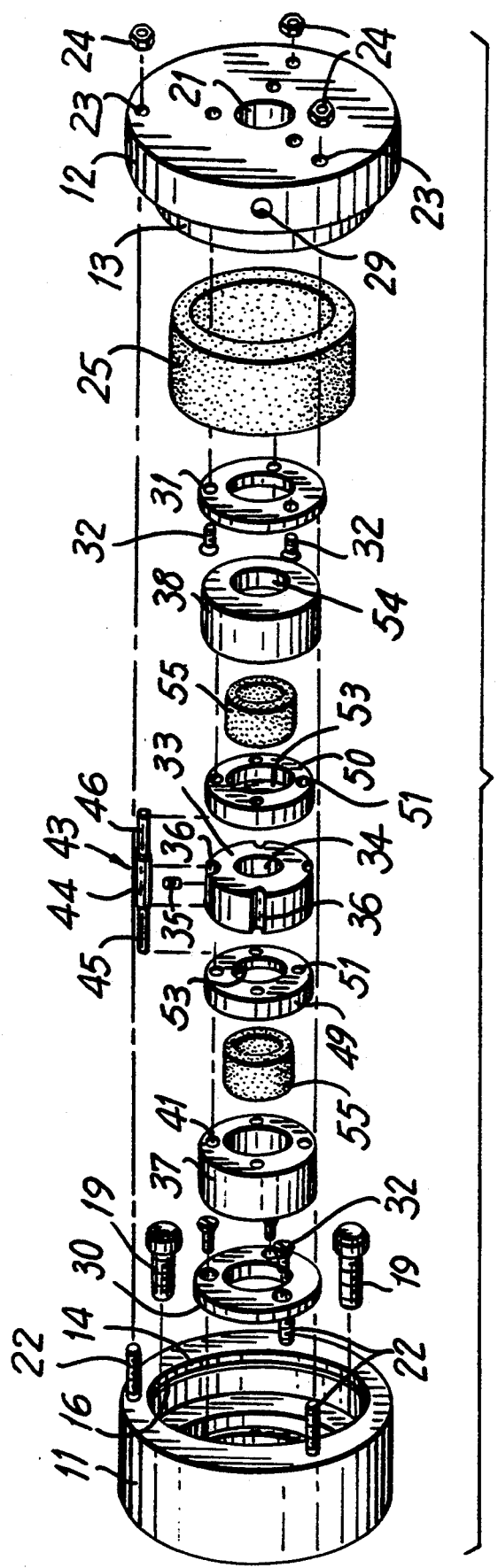
FIG. 1 is an exploded perspective view of the seal components.
Figure 2:
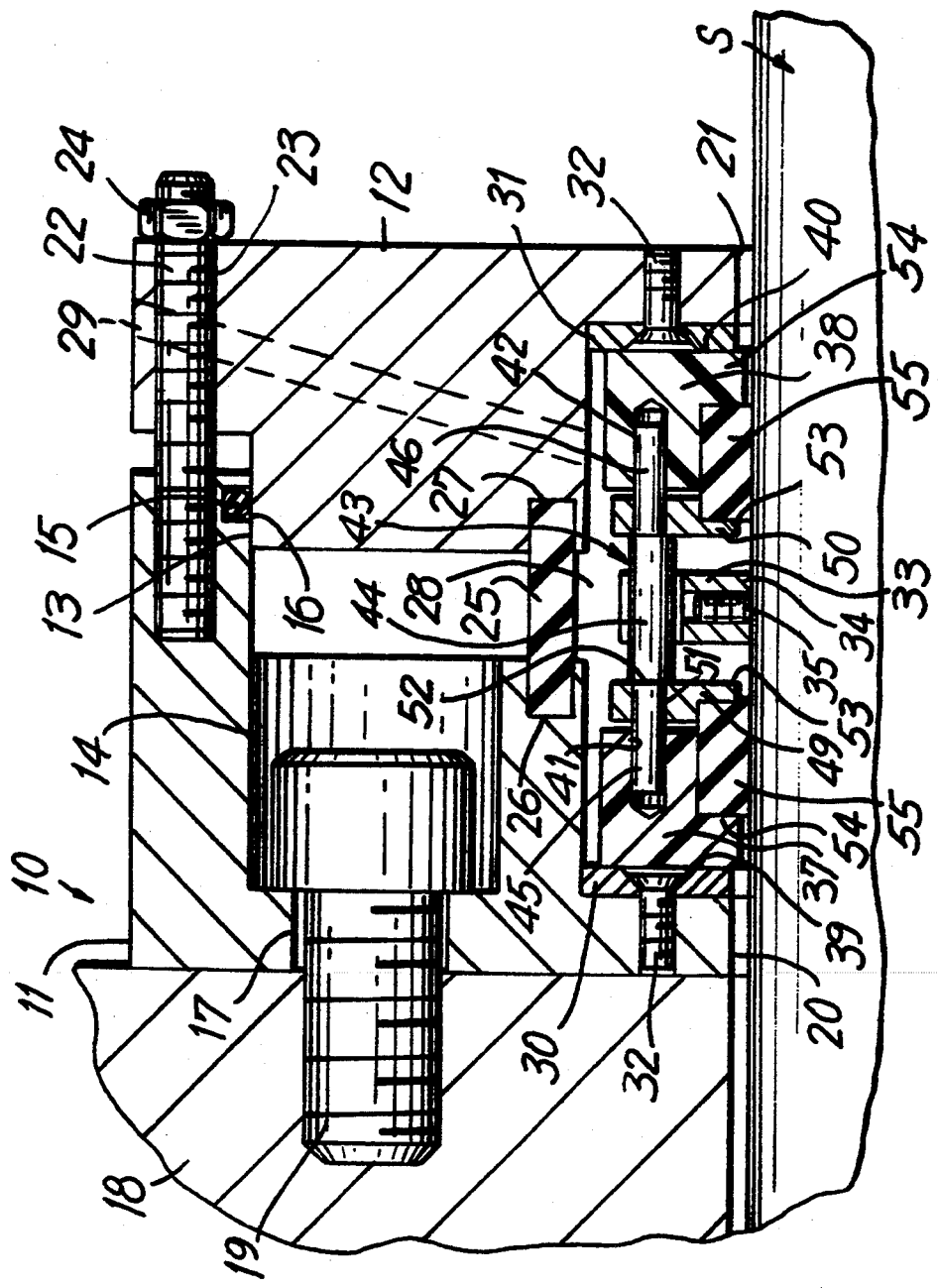
FIG. 2 is an enlarged fragmentary vertical section through the seal assembly mounted on a shaft.

Referring to the views there is disclosed in FIG. 1 an exploded perspective view of the seal components prior to assembly. The device includes a housing 10 comprised of two housing halves, namely female half 11 adapted to be mounted, by way of example, to the wall of a conveyor in surrounding relation of a shaft to be driven, and a male housing component 12 having a projecting boss 13 adapted to be received within cavity 14 of the housing component 11. Preferably, an O ring 15 is interposed in groove 16 in housing component 11 defining a seal between the housing components while enabling axial sliding movement therebetween.

The housing component 11 includes axially directed mounting bores 17 enabling the mounting of the seal assembly to the wall 18 of a conveyor or the like as by mounting bolts 19.

The housing halves 11,12 include axial apertures 20,21 respectively for the passage therethrough of shaft S. A plurality of threaded adjustment studs 22 project axially from housing half 11, the studs 22 extending through complementary spaced adjustment apertures 23 in housing half 12. Spacing of the housing halves is adjusted by tightening or loosening of adjustment nuts 24.

An annular elastomeric gasket 25 is interposed between the halves 11,12, the side margins of the gasket being received within mounting grooves 26,27. It will be appreciated that the gasket 25 is axially compressible and is deflected radially as a result of the tightening of the adjustment nuts 24. The gasket 25 defines a sealed cavity area 28 encompassing the shaft, the remaining components of the shaft seal being hereinafter described.

Optionally and preferably, one or more purge ducts 29 is formed in the housing leading to chamber 28 for enabling a pressure head to be developed within the chamber, and/or enabling flushing of any materials which may collect within the chamber.

There will next be described the elements which form the rotary seal proper. These elements include opposed stators 30,31 mounting to housing halves 11 and 12 respectively as by bolts 32, the stators being preferably formed of a polished wear resistant metal such as stainless steel. The stators are annular in configuration and surround the shaft S.

A drive collar 33 which is annular in configuration and includes a central aperture 34 encompassing shaft S is mounted generally centrally between the stators, the collar being keyed to the shaft for conjoint rotation therewith as by grub screws 35. The collar 33 includes in its outer periphery a series of drive channels 36 which are angularly spaced apart and axially aligned with the shaft axis. While in the illustrated embodiment the channels 36 are disclosed as formed in the outer perimeter of the collar, it is obvious that these channels could be formed as throughgoing axial passages in the collar.

A pair of annular rotors 37,38 are juxtaposed to stators 30 and 31 respectively, the rotors including radially extending seal faces 39,40 engaging the inwardly directed faces of the stators 30 and 31. The rotors 37,38 are preferably fabricated of a low coefficient sacrificial (intended to wear) material such as nylon, delrin, Teflon, etc. Obviously, the metal to polymer interface may be effected by forming the stators of polymer and the rotors of metal.

The rotors 37,38 are provided with drive apertures 41,42 for the receipt of drive pins 43. The drive pins 43 include a central enlarged section 44 and axially projecting drive fingers 45,46 received within apertures 41 and 42 respectively of the rotors. The interfit between the fingers and apertures enables sliding and a degree of tilting movement between the components.

A pair of pusher plates 49,50 are mounted on FIGS. 45,46 respectively, the plates including apertures 51 corresponding to the apertures 41 in the rotors. The spacing between plates 49,50 is established by abutment of the plates against radial shoulders 52 formed at the interface between the enlarged central section 44 of pins 43 and the finger portions 45 thereof.

The plates 49 and 50 include annular shoulders 53 directed toward the shaft S. Complemental shoulders 54 are formed on the rotors 37,38. A pair of annular elastomeric seals 55 are mounted on the shaft S, the seals being captured between the opposed shoulders 44 of the rotors and 53 of the pusher plates 49,50.

OPERATION

The operation of the device will be evident from the preceding description. Housing half 11 is mounted to wall 18, as described, with a shaft S extending through aperture 20 of the housing. As will be apparent from the views, the aperture 20 is oversize relative to the shaft whereby a degree of eccentricity of the shaft is accommodated. There is next mounted the drive assembly including the rotors, pusher plates, collar, and annular seals, the collar being locked to the shaft as by tightening of the grub screws 35. Finally, the outboard housing component 12 is slid over the shaft, and the housing halves connected by appropriately tightening the adjustment nuts 24. Tightening of the nuts 24 is desirably effected to a degree which must be determined on a case by case basis, the objective in all instances being to compress the rotors under the yieldable pressure of the elastomeric seals 55, such as to achieve a wiping engagement between the rotors and the stators. Optimal pressure of rotors against stators will vary in accordance with operating conditions, with over-tightening resulting in premature wear and undue drag, and under-tightening resulting in required frequent readjustment to prevent possible loss of sealing integrity.

In is recognized that in time the polymeric material of the rotor (or stator) will wear necessitating further tightening of adjustment nuts 24. It is important to note that the adjustment is readily accommodated by a sliding movement of the central portions 44 of drive pins within the drive grooves or drive apertures 36 of the drive collar. It is similarly important to note that since the annular gaskets 55 are not, as is the case with the prior art references cited, utilized to impart a driving torque to the rotors, it is possible to fabricate the members 55 of a compliant but low coefficient of friction material, or to line the inner diameters of the seals 55 with a low coefficient of friction material such a Teflon. The importance of the ability of the members 55 to be shiftable axially of the shaft will become immediately apparent when it is recognized that readjustment of the housing halves to obtain optimal wiping pressure necessitates axial shifting of the members 55 along the shaft. If, as is the case in the cited prior art devices, members 55 were necessarily formed of high coefficient of friction material (for driving the rotors), any such attempted shifting movement would result in a pinching or tearing of the elastomer, ultimately resulting in loss of seal integrity.

It will be further noted that uniquely, the seal of the instant invention permits of shaft elongation such as occurs when the temperature surrounding the shaft varies. Elongation is accommodated by a sliding of the pins 43 relative to collar 33 and a simultaneous shifting of the drive finger components 45,46 within the apertures 41,42 of the rotors.

In operation, it will be apparent that eccentricities of the shaft are readily accommodated due to the radially extending nature of the seal defined between rotors and stators. The passage of material along the shaft of the seal assembly is blocked by the engagement of the inner diameters of members 55 against the shaft surface. Passage of materials around the shaft is prevented by the wiping contact between the respective rotors and stators.

It will further observed that in the event that material should pass around the interface between the inboard rotor 37 and the inboard stator 30, that such material will nonetheless be entrapped within the sealed chamber 28, from which chamber it may be flushed in a controlled manner by the injecting of gas or liquid materials through the ducts 29 (which may be valved or sealed during normal operations) whereby contamination of the atmosphere is positively prevented.

From the foregoing, it will be appreciated that there is provided in accordance with the invention a long lasting, readily adjustable, highly efficient rotary seal for a shaft. Sealing is effected with only minimal frictional drag, as compared for instance to conventional stuffing box installations. Since there is no relative wiping movement between the shaft and materials held within the housing, shaft wear, such as is inevitably experienced with conventional stuffing boxes, is totally eliminated.

As will be apparent to those skilled in the art and familiarized with the instant disclosure, numerous variations in details of construction may be made without departing from the spirit of the invention. Accordingly, the invention is to be broadly construed within the scope of the appended claims.

Having thus described the invention and illustrated its use, what is claimed as new and is desired to be secured by Letters Patent is:

1. A positive drive compensating seal assembly for a shaft comprising a housing having first and second housing halves, first and second spaced annular stator portions on said first and second halves respectively, said stator portions being disposed perpendicular to and surrounding said shaft, first and second annular rotor means surrounding said shaft and juxtaposed to said first and second stator portions respectively, drive means on said shaft interposed between said rotors for connecting said rotors and rotationally coupling said rotors to said shaft, said drive means including a collar keyed to said shaft, a plurality of angularly spaced axially aligned drive pins axially, slideably engaging said collar, said pins connecting said first and second rotors, said drive means and rotors being shiftable axially of said shaft, (and) first and second resilient, axially expansible annular elastomeric seal members mounted on said shaft, said seal members including inner diameter portions in sealed engagement with said shaft, said seal members yieldable biasing said rotors against said stators, and adjustment means connecting said housing halves for shifting said halves toward and away from each other in the direction of the axis of said shaft.

2. A seal assembly in accordance with claim 1 wherein rotors include axially extending apertures, and the distal ends of said pins are slidably disposed within said apertures.

3. A seal assembly in accordance with claim 1 and including an axially compressible angular gasket interposed between said housing halves, said gasket defining with said housing halves a sealed chamber encompassing said seal assembly.

4. A seal assembly in accordance with claim 3 and including a purge duct formed in said housing and communicating with said chamber.

5. A seal assembly in accordance with claim 1 wherein said seal members comprise a low coefficient of friction material.

6. A seal assembly in accordance with claim 1 wherein said drive means include a collar keyed to said shaft first and second annular pusher plates mounted over said shaft and intervening between said collar and said first and second rotors respectively, said seal members being axially compressed between said rotors and pusher plates.

7. A seal assembly in accordance with claim 6 wherein said pusher plates include axially extending apertures formed therethrough and said drive pins extend through said apertures.

8. A seal assembly in accordance with claim 7 wherein said drive pins include first and second radially projecting shoulder portions directed toward said first and second rotors, respectively, said pusher plates being biased against said shoulder portions by said seal members.

9. A positive drive compensating seal assembly for a shaft comprising a housing having first and second spaced annular stator portions perpendicular to and surrounding said shaft, first and second annular rotor members surrounding said shaft and juxtaposed to said first and second stator portions respectively, said rotors being shiftable axially along said shaft, drive means on said shaft interposed between said rotors for connecting said rotors and rotationally coupling said rotors to said shaft, said drive means including a collar keyed to said shaft, first and second annular pusher plates mounted over said shaft and intervening between said collar and said first and second rotors respectively, axially extending apertures in said plates, a plurality of axially aligned drive pins slideably engaging said collar and rotors, said pins including first and second radially projecting shoulder portions directed toward said first and second rotors respectively, first and second resilient, axially expansible annular elastomeric seal members mounted on said shaft, said seal members including inner diameter portions in sealed engagement with said shaft, said seal members yieldably biasing said rotors against said stators, said pusher plates being biased against said shoulder portions by said seal members.

* * * * *